United States Patent [19]

Evans et al.

[11] Patent Number: 5,026,548

[45] Date of Patent: Jun. 25, 1991

[54] SURFACTANT

[75] Inventors: Roger Evans; Michael H. Jee; Nigel H. Sander; Ian H. Smith; Raymond K. Gibson, all of Berkshire, Great Britain

[73] Assignee: Cadbury Schweppes plc, Bournville, England

[21] Appl. No.: 293,163

[22] Filed: Dec. 28, 1988

[30] Foreign Application Priority Data

Apr. 28, 1987 [GB] United Kingdom ............... 8710041
Oct. 29, 1988 [GB] United Kingdom ............... 8825371

[51] Int. Cl.$^5$ ............................................. A61K 35/78
[52] U.S. Cl. ................................. 424/195.1; 514/549; 536/4.1; 536/18.2
[58] Field of Search ............... 536/4.1, 18.2; 514/53, 514/549; 424/195.1; 426/430; 260/412, 412.4

[56] References Cited

U.S. PATENT DOCUMENTS 2,636,888  4/1953  Washburn ........................... 260/403
4,053,492 10/1977  Boocock et al. .................. 260/412.4
4,089,848  5/1978  Bell et al. ........................ 536/114 X
4,211,695  7/1980  Oughton ............................. 530/372
4,211,801  7/1980  Oughton ............................. 426/430
4,390,469  6/1983  Oughton ............................. 530/372

FOREIGN PATENT DOCUMENTS 0121228   10/1984  European Pat. Off. .
1527101   10/1978  United Kingdom .
1552012    9/1979  United Kingdom .
WO88/08253 11/1988  World Int. Prop. O. .

Primary Examiner—John W. Rollins
Attorney, Agent, or Firm—Fleit, Jacobson, Cohn, Price, Holman & Stern

[57] ABSTRACT

A surfactant for use as a viscosity reducing agent in chocolate, or an emulsifier, surfactant or foam stabilizer in the food and other industries is produced by extracting oats using an alcohol such as ethanol or propanol, extracting the alcohol extract with methanol and evaporating the methanol. The alcohol extraction may be preceded by extraction with a non-polar solvent such as hexane. A water-soluble surfactant can be produced by extracting the methanol extract with acetone and recovering the acetone-insoluble material.

10 Claims, No Drawings

SURFACTANT

CROSS REFERENCE TO RELATED APPLICATION

This United States application stems from PCT International Application No. PCT/GB88/00321 filed Apr. 26, 1988.

This invention relates to a surfactant which is useful in the food industry, for example in the manufacture of chocolate, bread or margarine, and in the agricultural, chemical, cosmetic, pharmaceutical, building, textile and tanning industries. In the manufacture of chocolate, such surfactants are commonly referred to as "viscosity reducing agents" or "emulsifiers" because of the effect which they exert. Hereinafter, the term "surfactant" will be employed, although it is to be appreciated that this term is considered to be equivalent to the term "viscosity-reducing agent" or the term "emulsifier" in the field of chocolate manufacture.

It is common practice to use a surfactant in the manufacture of chocolate to assist in processing of the chocolate to enable the amount of expensive cocoa butter to be reduced. A know surfactant for this purpose is soya lecithin which is a phospholipid emulsifier. Another type of surfactant is a polyglycerolpolyricinoleate (PGPR) of which a sufactant commercially available as Admul WOL is an example. These two types of known surfactant differ in the way they change the viscosity of molten chocolate.

There are two major differences which can be identified between the effects of soya lecithin and PGPR in, for example, molten dark chocolate The first is that PGPR continues to reduce the viscosity at low shear rates (less than about $1 \, s^{-1}$) over the entire concentration range from 0.01 to 1% addition. In contrast, increasing the concentration of soya lecithin initially reduces these low shear rate viscosities to minimum values at about 0.20-0.25% addition levels and thereafter these viscosities increase. The second difference is in the effects at medium to high shear rates (7.9 to $100 \, s^{-1}$).

In this shear rate region, chocolate containing concentrations of 0.5% PGPR and above show Newtonian behaviour between 7.9 and $100 \, s^{-1}$ Data in the same shear rate region for chocolate containing 0.1-1% soya lecithin show viscosity still falling to values which are eventually lower than those for chocolate containing the equivalent quantity of PGPR.

Synthesized surfactants having a similar effect to soya lecithin are also known, such synthesized surfactants being produced, for example, by glycerolysis and phosphorylation of a triglyceride starting material such as partially hardened rape-seed oil. However, such synthesized surfactants differ from soya lecithin in that the viscosities at low shear rates do not tend to rise again from the minimum values as the emulsifier concentration is increased.

We have now found that surfactants for chocolate can be extracted from oats and that, by varying the extraction conditions, agents which simulate the viscosity- c reducing characteristics of the PGPR type or the soya or synthesized lecithin-type surfactants can be prepared.

Processes for the treatment of comminuted oats for the purpose of preparing oat bran, oat flour and oat oil are disclosed in GB-A-1527101 and GB-A-1552012- In such publications, the recovery of an oil fraction is disclosed by extracting comminuted oats with a solvent such as hexane, although the use of alcohols having 1-4 carbon atoms is disclosed as a possibility, and recovery of the oil from the solvent extract by complete removal of the hexane. It is also disclosed in such publications that the oil obtained may be turbid and that such oil may be clarified by mixing with isopropanol, agitating and then removing any solid material e.g. by centrifuging. It is also disclosed in such documents that the solids removed on centrifuging are believed to contain a significant amount of phospholipids and may be suitable for use, for example, as emulsifiers. However, no indication is given as to the intended field of use of such emulsifiers. Indeed, if hexane is used to extract the oats and the resulting turbid oil is centrifuged and degummed, then we have found that neither the remaining oil nor the gum are particularly active as viscosity reducing agents in chocolate.

We have found that surfactants having properties similar to soya lecithin in chocolate compositions can be produced by a single extraction of oats using a permitted, polar organic solvent.

Therefore, according to a first aspect of the present invention, there is provided a chocolate composition containing a surfactant obtainable by extraction of oats using a permitted polar solvent (eg a permitted aliphatic alcohol, preferably an alcohol having at least 2 carbon atoms, most preferably ethanol or isopropanol) to produce a polar solvent extract, and separation of an oil from the polar solvent extract, said oil being the surfactant.

It has also been found that if the polar solvent extract is extracted with a different polar solvent eg methanol followed by evaporation of the latter, a material is yielded which has properties similar to that of a PGPR-type surfactant when included in chocolate. Analysis of the methanol extract has shown that there is a group of glycolipids responsible for the observed viscosity-reducing behaviour. These glycolipids are derivatives of glycerol with a digalactosyl residue attached to one of the primary hydroxyls of the glycerol molecule. The remaining two glycerol hydroxyls are esterified with fatty acids.

One or more of these fatty acids is an unsaturated hydroxy fatty acid which is esterified through the hydroxyl group with a further fatty acid. An example of the formula of one of these rheologically active glycolipids is given below:

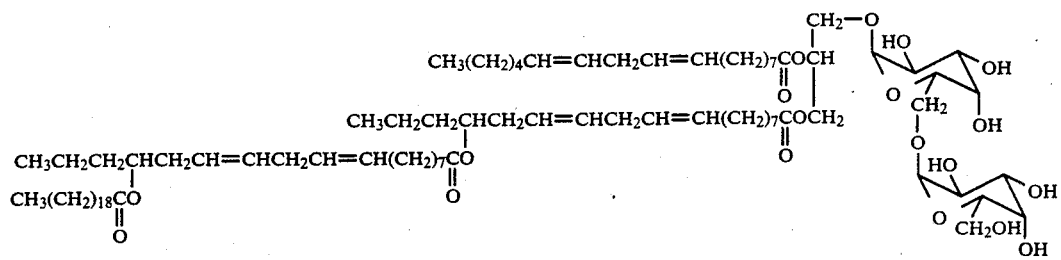

In the formula above, it will be seen that the further fatty acid is the same as one of the unsaturated fatty acid attached to the glycerol moiety.

The rheologically active glycolipids may be expressed by the following general formula:

$$\begin{array}{l} CH_2-O-R_1 \\ CH-O-R_2 \\ CH_2-O-R_3 \end{array}$$

wherein $R_1$ is a digalactosyl residue, and each of $R_2$ and $R_3$, which may be the same or different, is a fatty acid residue, preferably an unsaturated fatty acid residue; provided that at least one of $R_2$ and $R_3$ is an unsaturated hydroxy fatty acid residue ($F_1$) which is esterified through the hydroxy group thereof with a further fatty acid residue ($F_2$) which may itself be unsaturated and which in turn may have a hydroxy group optionally esterified by another fatty acid residue ($F_3$). The fatty acid residue $F_3$ may be a saturated fatty acid. $F_1$ and $F_2$ may be the same. In the case where only one of $R_2$ and $R_3$ is as defined above, the other of $R_2$ and $R_3$ may be based on the same fatty acid as $F_1$, although it need not be a hydroxy acid residue.

The present invention comprehends the use of one or more such rheologically active glycolipids as a surfactant irrespective of the route of production or isolation thereof and the raw material used.

According to a second aspect of the present invention, there is provided a method of preparing a surfactant for chocolate, comprising the steps of extracting oats using a permitted non-polar organic solvent, re-extracting the oats using a permitted polar solvent to produce a polar solvent extract, and separating an oil from said polar solvent extract.

In said second aspect of the present invention, the oil which has been separated from the polar solvent extract can be used directly as a surfactant and has properties close to that of a PGPR-type surfactant. Such a surfactant is particularly effective at low shear rates.

The non-polar solvent is preferably a permitted alkane, more preferably hexane. The polar solvent is preferably a permitted aliphatic alcohol, most preferably ethanol or isopropanol.

In the method of the present invention using non-polar and polar solvents, the oil is preferably separated from the polar organic solvent by evaporation of part of the solvent from the solvent extract until the oil separates from the latter. The material which remains dissolved in the solvent after partial evaporation has been found to be relatively inactive as a surfactant in chocolate. The oil which constitutes the surfactant has limited solubility in the polar organic solvent.

The ratio of solvent to oats is not particularly critical. For a soxhlet-type extraction, 3-6 liters of solvent per kg of oats can be used. With solvent extraction at room temperature, 2 liters solvent per kg of oats can be used.

Extraction using the polar organic solvent may be effected at a temperature between room temperature and the boiling point of the solvent. To maximise the efficiency of the extraction, the use of comminuted oats is preferred.

According to a third aspect of the present invention, there is provided a surfactant for chocolate obtainable by extraction of oats using a permitted non-polar organic solvent; re-extraction of the oats using a permitted polar solvent to produce a polar solvent extract; and separation of an oil from the polar solvent extract.

According to a fourth aspect of the present invention, there is provided a chocolate composition containing a surfactant as defined in the last preceding paragraph.

The concentrations at which the surfactants according to the present invention are incorporated into chocolate compositions are similar to those at which the conventional surfactants discussed above can be employed, e.g. typically 0.25-0.5% by weight of the chocolate. The use of such surfactants enables the amount of cocoa butter to be reduced by up to about 13% of the total fat present.

The surfactants of the present invention are useful in dark, blended, milk or white chocolate compositions. Such chocolate compositions all contain sugar, non-fat cocoa solids and cocoa butter and typically have the following ingredients (in percent by weight):

| Ingredient | Chocolate Type | | | |
|---|---|---|---|---|
| | Dark | Blended | Milk | White |
| Sugar | 55 | 50 | 46 | 48 |
| Non-fat cocoa solids | 16 | 10 | 5 | — |
| Cocoa butter | 21.25 | 22.25 | 19.25 | 19.25 |
| Vegetable fat | 4.5 | 4.5 | 4.5 | 4.5 |
| Non-fat Milk solids | — | 9 | 18 | 20 |
| Milk fat | 3 | 4 | 7 | 8 |
| Emulsifier | 0.25 | 0.25 | 0.25 | 0.25 |

An object of a fifth aspect of the present invention is to provide a general purpose surfactant. It is an object of a sixth aspect of the invention to provide a surfactant which is water-soluble.

According to a fifth aspect of the present invention, there is provided a process for the preparation of a surfactant comprising the steps of extracting oats using a permitted aliphatic alcohol having at least two carbon atoms (preferably ethanol or isopropanol) to produce an alcohol extract, extracting the alcohol extract with methanol to produce a methanol extract, and evaporating methanol from the methanol extract to produce the surfactant.

The thus-produced surfactant is particularly useful as an emulsifying agent and stabilizer favouring the formation of water-in-oil emulsions when it has been pre-dissolved in the oil phase. The surfactant is also useful in the bread making industry to enhance the loaf volume and to increase the openness of the crumb grain in bread. Thus, the present invention also resides in the use of such a surfactant in bread making. The surfactant is also found to give rise to small water droplet sizes in margarine and to give small fat crystal aggregate sizes therein. Furthermore, the surfactant is also effective as an anti-spattering agent in margarine. Thus, the present invention also resides in the use of such a surfactant in the manufacture of margarine.

According to a sixth aspect of the present invention, there is provided a process for the preparation of a surfactant comprising the steps of extracting oats using a permitted aliphatic alcohol having at least two carbon atoms (eg ethanol or isopropanol) to produce an alcohol extract, extracting the alcohol extract with methanol to produce a methanol extract, extracting the methanol extract with acetone, and recovering the acetone-insoluble material.

The extraction with acetone is preferably effected by repeatedly washing the methanol extract with acetone.

The acetone-insoluble material after recovery is preferably dried, eg in a vacuum oven.

The surfactant produced by the process according to said sixth aspect of the present invention is useful as an emulsifying agent favouring water-in-oil (eg vegetable oil, mineral oil such as a hydrocarbon oil, or animal oil) emulsions when pre-dissolved in the oil phase, and oil-in-water emulsions when pre-dissolved in the aqueous phase. Thus, the present invention also resides in the use of the surfactant produced by the process of said sixth aspect of the present invention as an emulsifying agent and/or stabilizer in water-in-oil emulsions and oil-in-water emulsions.

The surfactant prepared by the process of said sixth aspect of the present invention is also useful in bread making for enhancing the loaf volume and increasing the openness of the crumb grain in bread. Accordingly, the present invention also resides in the use of such a surfactant in bread making.

The surfactant prepared by the process according to said sixth aspect of the present invention also aids the formation and stabilisation of aqueous foams. Thus, the present invention also resides in the use of such a surfactant in the formation and stabilization of aqueous foams.

The surfactant prepared by the process acccording to said sixth aspect of the present invention also gives rise to small water droplet sizes in margarine and is effective as an anti-spattering agent in margarine. Thus, the present invention also resides in the use of the surfactant prepared by the process according to the sixth aspect of the present invention in margarine.

According to a seventh aspect of the present invention, there is provided an anti-spattering agent for margarine and margarine containing such an anti-spattering agent, said anti-spattering agent being obtainable by extracting oats using a permitted aliphatic alcohol having at least two carbon atoms (preferably isopropanol) to produce an alcohol extract, and separating an oil from such alcohol extract.

According to an eighth aspect of the present invention, there is provided a process for the preparation of a surfactant comprising recovering acetone-soluble material from the acetone used in the acetone extraction step of the process according to the sixth aspect of the present invention.

The recovery of the acetone-soluble material is preferably effected by evaporation of acetone from the acetone washings.

The surfactant prepared by the process according to the eighth aspect of the present invention is a PGPR-type surfactant and in chocolate has similar viscosity-reducing properties to that of the methanol extract from which it was derived.

The ability of surfactants to aid the emulsification of oil in water or water in oil, and to stabilise the emulsion is an important property in many products. In the context of emulsion formation, surfactants are frequently referred to as emulsifiers but this term has become a commmon name, particularly in the food industry, even when the surfactant is not being used specifically as an emulsifier. The emulsifying properties of surfactants arise from the reduction in interfacial tension between the water and the oil phase which takes place when the surfactant adsorbs at the interface. This diminishes the mechanical energy required to form the large interfacial area in the emulsion. The adsorbed layer of surfactant surrounding the droplets of the dispersed phase can prevent coalescence by forming a cohesive interfacial film and also by introducing steric and electrostatic repulsion forces. Surfactants exhibit different solubilities in solvents based upon their structure, and the balance between the hydrophilic (polar) and the lipophilic (apolar) parts of the molecule which is known as the HLB. The more polar, hydrophilic, surfactants tend to be more soluble in water and promote the formation of oil-in-water emulsions, whereas the less polar, lipophilic, surfactants tend to be more soluble in oil and promote water-in-oil emulsions.

The isopropanol/methanol (IPA/MeOH) extract of oats (pre-dissolved in the oil) is an excellent water-in-oil emulsifier and stabiliser over a wide temperature range, whereas the acetone-insoluble fraction (pre-dissolved in water) gives good emulsification of oil in water.

The functionality of food emulsifiers incorporated into bread recipes extends beyond the ability to emulsify oil in water or water in oil. The terms used to describe some of the more complex functions of these emulsifiers in bread making include, for example, "softener", "dough conditioner", "starch complexing agent", "bread improver", "antistaling agent", "protein complexing agent" and "volume improver", see Hughes, E. J. (1975) *Baking Industries Journal*, February, 22.

Some of these terms such as "softener", "antistaling agent" and "starch complexing agent" can all describe the same underlying function of the emulsifier which, in this case, refers to the complex formed by the penetration of the amylose helix in starch by an emulsifier molecule. Similarly, the terms "protein complexing agent", "bread improver" and "volume improver" can be linked to the ability of emulsifiers to interact with the proteins particularly glutenin and gliadin in the wheat flour gluten.

The unique ability of wheat flour in yeast-leavened products to retain gases, mainly carbon dioxide, produced during fermentation is impaired when the free lipids in the flour are removed by extraction with non-polar solvents such as petroleum ether, see Daftary et al (1968) *Food Technology*, 22,327. The property is restored when the polar lipid fraction, composed mainly of glycolipids, is added back to the flour. Glycolipids in the free polar lipids can be bound simultaneously to gliadin by hydrophilic bonds and to the glutenin by hydrophibic bonds, see Hosenay et al (1970) *Cereal Chemistry*, 47, 135.

The surfactant produced according to the first to third aspects of the present invention are all able to enhance loaf volume and increase the openness of the crumb grain in bread.

In simple air/water foam systems, the effect of surfactants is explained through their ability to reduce the surface tension of water and form interfacial films by adsorption and molecular orientation at the interface. The acetone-insoluble fraction of the IPA/MeOH extract of oats, which is water-soluble and reduces the surface tension of water, is also a satisfactory foaming agent in aqueous solution.

Emulsifiers are used in margarine in order to create and stabilise a finely dispersed water-in-oil emulsion before partial crystallisation of the fat phase. This is desirable in order to improve texture, stability, shelf-life etc. and is necessary for all types of margarine. However, further functional properties are required in special margarines One of these is the ability to minimise spattering during open-pan frying. Spattering is caused when water droplets in the melted fat coalesce and sink down to the surface of the hot frying Pan. At this point they evaporate vigorously causing splashing of the molten fat outside the pan.

Both a small water droplet size and a small fat crystal aggregate size are conferred on margarine by the incorproration of the IPA/MeOH extract of oats. Furthermore, this particular extract and its acetone-insoluble fraction impart excellent anti-spattering properties.

Examples of the present invention will now be described. In Examples 1 to 6 and the relevant Tables, evaluation of the viscosity-reducing properties was effected using dark chocolate compositions A and B and milk chocolate composition C. Chocolate samples A, B and C initially contained 32 wt %, 31.9 wt % and 33 wt % fat respectively and, in each case, the combined fat plus emulsifier content was raised a constant 1 wt % by incorporation of 0.5 wt % of emulsifier or oat fraction mixed with 0.5 wt % cocoa butter. The control sample with no emulsifier was prepared by addition of 1 wt % cocoa butter in order to distinguish genuine activity from dilution effects. Although soya lecithin appears to be less effective in reducing the viscosity of milk chocolate than dark chocolate, particularly at low shear rates, the general effects of the emulsifiers show the same trends in both systems.

EXAMPLE 1

Rolled oats (830 g) sold as "Jumbo Oats" by Morning Foods, were loosely packed into a glass column (72 cm ×5.5 cm i.d.) and then continuously extracted at room temperature by circulating isopropanol (1750 ml) through the column for 1 hour. The column was allowed to drain and the extraction procedure repeated a further three times using a fresh charge of solvent each time. The isopropanol extracts were concentrated under vacuum to yield four fractions (fractions 1a–1 d) Each fraction was incorporated in emulsifier free dark chocolate at a concentration of 0.5%. A summary of the rheological properties of fractions 1a–1d is given in Table 1. The yield of each fraction is detailed below: (all percentages by weight)

| Fraction | Yield (g) | Yield (% of Oats) |
| --- | --- | --- |
| 1a | 41.5 | 5 |
| 1b | 9.1 | 1.1 |
| 1c | 2.5 | 0.3 |
| 1d | 1.7 | 0.2 |
| Total | 54.8 | 6.6 |

EXAMPLE 2

Rolled Jumbo oats (820 g) were loosely packed into a glass column (72 cm ×5.5 cm i.d.) and then continuously extracted at room temperature by circulating ethanol (1750 ml) through the column for 1 hour 15 minutes. The column was allowed to drain and the extraction procedure repeated a further four times using a fresh charge of solvent each time. The ethanol extracts were concentrated under vacuum to yield five oil fractions (fractions 2a–2e is given in Table 1. The yield of each of the fractions is detailed below: (all percentages by weight)

| Fraction | Yield (g) | Yield (% of Oats) |
| --- | --- | --- |
| 2a | 19.8 | 2.4 |
| 2b | 10.7 | 1.3 |
| 2c | 8.2 | 1.0 |
| 2d | 13.1 | 1.6 |
| 2e | 2.5 | 0.3 |
| Total | 54.3 | 6.6 |

EXAMPLE 3

Rolled Jumbo Oats (25 kg) were loosely packed into a glass column [9 inch (23 cm) diameter]and then continuously extracted for 40 minutes with isopropanol (60 liters) heated to 70° C. The column was allowed to drain and the extraction procedure repeated a further two times using a fresh charge of solvent each time. The isopropanol extracts were concentrated under vacuum to yield 1.6 kg of an oil (fraction 3a). A summary of the rheological properties of fraction 3a are given in Table 1.

Following removal of the isopropanol, the oil (1.6kg) was thoroughly mixed with methanol (7.5 liters). On standing the mixture separated into two layers. The methanolic upper layer was removed and the lower layer was then extracted a further two times with methanol (7.5 liters). The three methanol extracts were combined and the methanol removed under vacuum to yield 424 g of a viscous material (fraction 3b). The material which did not extract into the methanol (fraction 3c, 1.1 kg) was mainly composed of triglycerides. A summary of the rheological properties of fractions 3b and 3c are given in Table 1.

EXAMPLE 4

Rolled Jumbo oats (650 g) were filled to give a coarse flour which was then extracted with 3000 ml of ethanol in a soxhlet apparatus for 16 hours. The ethanol extract was concentrated under vacuum to approximately 500 ml at which point 26 g (4% of the oats) of an oil fraction had separated from the ethanol. This oil fraction (fraction 4a) was incorporated into emulsifier free dark chocolate B at a concentration of 0.5%. A summary of the rheological properties of fraction 4a is given in Table 1. Removal of the remaining solvent yielded 11.7 g (1.8% of the oats) of a second fraction (fraction 4b) which did not effect a significant viscosity reduction in chocolate.

EXAMPLE 5

Rolled Jumbo oats (650g) were milled and the flour extracted with 3000 ml of n-hexane in a soxhlet apparatus for 16 hours. The hexane extract was evaporated to yield an oil containing a suspension of solid matter. The solid was removed by centrifugation and discarded. Water was added to the clarified oil to a concentration of 1.5%. The mixture was shaken and left at room temperature for 4 hours during which time a gum precipitated. The gum was recovered by centrifugation and dried under vacuum. Neither the water-washed oil (fraction 5a) for the gum (fraction 5b) effected a significant viscosity reduction in chocolate.

The hexane-extracted oats were re-extracted in the soxhlet apparatus with 3000 ml of ethanol for 16 hours. The ethanol extract was concentrated under vacuum to approximately 100 ml at which point an oil fraction had separated from the ethanol. This oil fraction (fraction 5c) was incorporated into emulsifier-free dark chocolate A at a concentration of 0.5%. A summary of the rheological properties of fraction 5c is given in Table 2. Removal of the remaining solvent yielded a fourth fraction (fraction 5d) which did not effect a significant viscosity reduction in chocolate. The yields of the various fractions were as follows: (all percentages by weight)

| Fraction | Yield (g) | Yield (% of Oats) |
|---|---|---|
| Fraction 5a | 45.5 | 7 |
| Fraction 5b | 3.9 | 0.6 |
| Fraction 5c | 7.8 | 1.2 |
| Fraction 5d | 4.6 | 0.7 |
| Total | 61.8 | 9.5 |

EXAMPLE 6

Fractions of oats were prepared by extraction of rolled oats with ethanol, as described in Example 2. However, in this case, all the fractions were combined into one bulk sample (fraction 6a). A similar extraction with isopropanol, as described in Example 1, yielded a bulk extract, fraction 6b. As described in Example 5, oats were extracted with hexane and the residue re-extracted with ethanol. This produced a second sample of material similar to fraction 1c, designated fraction 6c.

Fractions 6a, 6b and 6c were each introduced into emulsifier-free milk chocolate C at a concentration of 0.5%. A summary of the rheological properties of milk chocolate C containing fractions 6a–c are given in Table 3 below.

TABLE 1

| Dark Chocolate A containing | Viscosity (Pa s) at 40° C. and at shear rates | | | | |
|---|---|---|---|---|---|
| | 0.5 | 1.0 | 7.9 | 25.1 | 100 s$^{-1}$ |
| No emulsifier | 96 | 63 | 17 | 10 | 6.7 |
| Soya lecithin | 45 | 27 | 5.5 | 3.5 | 2.6 |
| PGPR (Admul WOL) | 15 | 6.1 | 3.2 | 3.2 | 3.2 |
| Fraction 1a | 37 | 26 | 7.4 | 5.0 | 3.8 |
| Fraction 1b | 36 | 25 | 6.8 | 4.7 | 3.7 |
| Fraction 1c | 24 | 17 | 5.5 | 3.9 | 3.3 |
| Fraction 1d | 24 | 16 | 5.1 | 3.8 | 3.3 |
| Fraction 2a | 32 | 20 | 5.5 | 3.9 | 2.9 |
| Fraction 2b | 37 | 26 | 6.7 | 4.7 | 3.8 |

TABLE 1-continued

| Dark Chocolate A containing | Viscosity (Pa s) at 40° C. and at shear rates | | | | |
|---|---|---|---|---|---|
| | 0.5 | 1.0 | 7.9 | 25.1 | 100 s$^{-1}$ |
| Fraction 2c | 46 | 32 | 7.9 | 5.7 | 4.6 |
| Fraction 2d | 46 | 32 | 9.6 | 6.5 | 4.8 |
| Fraction 2e | 41 | 28 | 9.0 | 6.2 | 4.8 |
| Fraction 3a | 61 | 37 | 6.4 | 4.4 | 3.4 |
| Fraction 3b | 25 | 16 | 3.1 | 2.4 | 2.0 |
| Fraction 3c | 81 | 55 | 11 | 7.3 | 5.4 |
| Fraction 4a | 42 | 19 | 5.6 | 3.6 | 2.8 |

TABLE 2

| Dark Chocolate B containing | Viscosity (Pa s) at 40° C. and at shear rates | | | | |
|---|---|---|---|---|---|
| | 0.5 | 1.0 | 7.9 | 25.1 | 100 s$^{-1}$ |
| No emulsifier | 82 | 52 | 15 | 7.2 | 5.7 |
| Soya lecithin | 36 | 21 | 5.0 | 2.8 | 1.9 |
| PGPR (Admul WOL) | 8.5 | 6.2 | 3.3 | 3.3 | 3.3 |
| Fraction 5c | 17 | 7.1 | 2.6 | 2.1 | 2.0 |

TABLE 3

| Milk Chocolate C containing | Viscosity (Pa s) at 40° C. and at shear rates | | | | |
|---|---|---|---|---|---|
| | 0.5 | 1.0 | 7.9 | 25.1 | 100 s$^{-1}$ |
| No emulsifier | 83 | 43 | 6.8 | 4.0 | 2.8 |
| Soya lecithin | 73 | 40 | 6.0 | 3.3 | 2.0 |
| PGPR (Admul WOL) | 27 | 15 | 2.6 | 2.2 | 2.1 |
| Fraction 6a | 55 | 34 | 6.6 | 3.5 | 2.3 |
| Fraction 6b | 55 | 30 | 5.5 | 2.9 | 2.0 |
| Fraction 6c | 40 | 21 | 3.7 | 1.9 | 1.7 |

In addition to the rheological data for the active oat fractions detailed in the above Examples, Tables 1, 2 and 3 also contain comparable data for no emulsifier, soya lecithin and PGPR.

Oat fraction 5c (Table 2) reduces the low shear rate chocolate viscosities to values which are considerably less than for soya lecithin but not quite as low as for PGPR. At high shear rates, the viscosities of chocolate containing this oat fraction are closer to those for chocolate containing soya lecithin rather than PGPR. Fraction 5c in particular gives rise to almost Newtonian behaviour over the medium to high shear rate range (7.9–100 s$^{-1}$) which again is characteristic of PGPR. The performance of oat fraction 1a (Table 1) is likewise very similar to that of PGPR at low and medium shear rate but tends more towards soya lecithin type behaviour at high shear rates. Oat fraction 1b gives viscosity characteristics very similar to those for soya lecithin over the entire shear rate range. In general, the behaviour of oat fractions 2a to 2e and 1a to 1d resembles that of soya lecithin. However, some of these fractions are more effective than soya lecithin at low shear rates e.g. 2a, 1c and 1d.

The effect of oat fractions 6a–6c on the rheological properties of milk chocolate (Table 3) closely follow the dark chocolate results given in Examples 1–5. Fractions 6a and 6b resemble scya lecithin more than PGPR in their effects on the rheological properties of milk chocolate. Fraction 6c reduces the low shear rate viscosities to values between those of soya lecithin and PGPR, and the medium to high sear rate viscosities (25.1 –100 s$^{-1}$) to values slightly lower than those of either soya lecithin or PGPR. As in the case of fraction 5c in dark chocolate, fraction 6c gives rise to almost Newtonian behaviour over the hither shear rate range in milk chocolate, once again resembling PGPR.

The following Examples 7 to 13 illustrate other uses of surfactants according to the present invention:

EXAMPLE 7

Preparation of IPA Extract of Oats

Rolled Jumbo oats (25 kg) were loosely packed into a glass column (9 inch diameter) and then continuously extracted for 40 minutes with isopropanol (60 liters) heated to 70° C. The column was allowed to drain and the extraction procedure repeated a further two times using a fresh charge of solvent each time. The isopropanol extracts were concentrated under vacuum to yield 1.6 kg of an oil.

EXAMPLE 8

Preparation of IPA/MeOH Extract of Oats

The isopropanol extract of rolled Jumbo oats (1.6 kg), prepared as described in Example 7, was thoroughly mixed with methanol (7.5 liters). Or standing the mixture separated into two layers. The methanolic upper layer was removed and the lower layer was then extracted a further two times with methanol (7.5 liters). The three methanol extracts were combined and the methanol removed under vacuum to yield 424 g of a viscous material. The material which did not extract into the methanol was mainly composed of triglycerides.

EXAMPLE 9

Preparation of Acetone-insoluble Fraction of IPA/MeOH Extract of Oats

The methanol extract of the isopropanol extract of rolled oats (30 g) prepared as described in Example 8, was thoroughly mixed with acetone (250 ml). The solids were allowed to settle and the acetone washing was decanted from the solids. The extraction of the solids was repeated twice further with 250 ml of acetone and then twice with 50 ml of acetone yielding 7.95 g of acetone-insoluble solids after removal of the last traces of acetone under vacuum.

EXAMPLE 10

Emulsion Formation

Mixtures composed of equal volumes (100ml) of either cyclohexane or corn oil (Sigma Chemical Co. Ltd.) and purified water (Rathburn Chemical Co. Ltd., HPLC grade) containing a total of 5% w/v emulsifier were prepared in stoppered 250 ml graduated cylinders. The emulsifier was dissolved either in the aqueous or the oil phase prior to mixing the two phases. Each cylinder with its contents was then cooled to 5° or 10° C. and the contents shaken ten times. After a rest period of 5 min, the phase volumes of emulsion and separated aqueous and oil phases were recorded. The temperature was then raised by 5° C. and the procedure repeated up to a temperature of 65° C.

The following emulsifiers were used in the above test with cyclohexane and water.
1. IPA/MeOH extract of oats (product of Example 8).
2. IPA extract of oats (product of Example 7).
3 Acetone-insoluble fraction of the IPA/MeOH extract of oats (product of Example 9).
4. Admul WOL (polyglycerolpclyricinoleate).
5. SN (soyabean lecithin).
6. Acetone-insoluble fraction of SN.
7. YN(ammonium salts of phosphatidic acids), Cadbury Ltd.
8. SPS, sucrose palmitate stearate 15 (Serva, Feinbiochemica, Heidelberg). Palmitate 70%, stearate 30%, monoester 70%, di- +triester 30%, HLB ca. 15.
9. Epikuron 145V, (Lucas Meyer, Gmbh & Co.), fractionated soya lecithin containing 51.6% phosphatidylcholine.
10. Epikuron 170, fractionated soya lecithin containing 75.2% phosphatidylcholine.
11. Epikuron 200, fractionated soya lecithin containing 92% phosphatidylcholine.

All of these were pre-dissolved at 10% in cyclohexane. The acetone-insoluble fraction of the IPA/MeOH extract of oats was initially pre-dissolved in the water and then subsequently in cyclohexane. The Epikuron samples were also run twice, pre-dissolving each of them in the water and then in the cyclohexane. Experiments using corn oil were confined to the IPA/MeOH extract at 5% and also at 2.5% w/v in the total mixture; the emulsifier was pre-dissolved in the corn oil.

Results and discussion

The results of the tests enabled the behaviour of the emulsifiers to be grouped into three types; those promoting water-in-oil emulsions, those promoting oil-in-water emulsions and those having no or little emulsifying capacity are summarised in Table 4.

Amongst the water-in-oil emulsion promoters is the IPA/MeOH extract of oats. This extract gave complete emulsification of the water in the cyclohexane with only a thin layer of the oil separating at higher temperatures. In the corn oil/water mixture, the IPA/MeOH extract showed excellent emulsifying capacity over the entire temperature range and this behaviour was also maintained when the concentration of the emulsifier in the mixture was reduced from 5 to 2.5%.

The other promoters of water-in-oil emulsions include the acetone-insoluble fraction of the IPA/MeOH oat extract pre-dissolved in cyclohexane, Admul WOL, YN and Epikuron 200 (pre-dissolved in the water). Of these, Admul WOL showed the greatest emulsifying capacity, comparable with that of the IPA/MeOH oat extract. YN was almost as good as these two, but Epikuron 200 and the acetone-insoluble fraction of the IPA/MeOH oat extract were both poor at low temperatures and improved at temperatures above 30° C. and above 50%C, respectively.

The emulsifiers promoting oil-in-water emulsions include the acetone-insoluble fraction of the IPA/MeOH oat extract, SPS and the Epikuron I45V and 170, all pre-dissolved in the water. All of these displayed good emulsifying capacity at higher temperatures. Generally the acetone-insoluble fraction of oat extract and SPS were better emulsifiers than the Epikuron samples.

Finally the poor emulsifiers allowed almost complete separation of the water and oil phases at all temperatures and two of them, the IPA extract of oats and SN, gave an interfacial precipitate.

EXAMPLE 11

Bread

Procedure

Small loaves of bread were made incorporating various emulsifiers using the Chorleywood breadmaking process.

The following ingredients were weighed into a bowl.
- 1 kg Canadian Spring wheat flour (moisture content 14.6%)
- 18 g salt
- 25 g fresh bakers' yeast
- 7 g lard
- 100 mg ascorbic acid
- 10 g emulsifier.

These were tipped into a Z-mixer and mixed on slow speed for 100 s. Mixing was continued whilst 620 ml warm (32° C.) water was added. The dough was scraped down from the sides and then developed i; the Z-mixer on fast speed for 18 watt hours. The dough was removed and divided into 460 g dough pieces, each of which was put through a moulder. Initial proving was performed at 40° C. for 10 min after which the pieces were remoulded and placed in a greased bread tin. A further proving for 48 min at 40° C. was performed before the dough was baked in an oven at 232° C. for 27-30 min. The bread was then removed from the tin and allowed to cool.

Four or five batches of three loaves were baked per day; the first and last were controls containing no added emulsifier and two or three different emulsifiers were used in the intermediate batches. These were as follows:
1. IPA/MeOH extract of oats (product of Example 8).
2. IPA extract of oats (product of Example 7).
3. Acetone-insoluble fraction of the IPA/MeOH extract of oats (products of Example 9).
4. Artodan SP 55 (Grinstead Products Ltd.)—Sodium and calcium stearoyl-2-lactylates.
5. Dimodan PV (Grinstead Products Ltd.)—distilled monoglycerides.
6. Panodan 10V (Grinstead Products Ltd.)—diacetyl tartaric acid esters of monoglycerides.
7. Triodan 55 (Grinstead Products Ltd.)—polyglycerol esters of fatty acids.

Test procedures

After cooling the loaves, measurements of loaf weight and volume (rapeseed displacement method) were made. In addition, one loaf from each batch was sliced and details of the internal crumb structure were recorded.

Results and discussion

The data on loaf size were used to determine the percentage increase in mean specific volume due to the presence of emulsifier. This was calculated as $$\% \text{ increase in loaf specific vol.} = \left( \frac{\text{mean sp. vol. of loaves with emulsifier}}{\text{mean sp. vol. of control loaves}} - 1 \right) \times 100$$

where specific volume is defined as the volume per unit weight of the loaf. The results are listed in Table 5.

The oat extracts generally gave a significant increase in loaf specific volume. Of these, the IPA/MeOH extract gave the highest value of 9.4%. This value was approaching those produced from the best two commercial emulsifiers, Artodan and Panodan, at about 12-13%, and was better than those produced by Dimodan and Triodan.

In general, when the loaf specific volume was increased, there was a concomitant increase in the openness of the crumb texture.

EXAMPLE 12

Foam Formation

Procedure

Foam tests were performed according to the method developed for proteins at the Leatherhead Food R.A., see Poole et al (1984) *J. Sci. Food Agric,* 38,701. Samples of surfactant (1.25 g) were dissolved in 250 ml of purified water (Rathburn Chemical Co. Ltd., HPLC grade) using a magnetic stirrer. These solutions were whipped at maximum speed (200 rev min-1) for 5 min in a Kenwood Chef Model A901 mixer. Foams were transferred into either a 1 or 2 liter measuring cylinder, using a kitchen spatula if necessary, and the foam volume and liquid drainage were measured at 5 min intervals up to 30 min.

The following parameters were then calculated and plotted as a function of time.

$$\% \text{ Foam expansion } (FE) = \frac{\text{foam volume (ml)}}{\text{initial liquid volume (250 ml)}} \times 100$$

$$\% \text{ Foam liquid stability } (FLS) = \frac{\text{volume of liquid (ml) retained in foam after 30 min}}{\text{volume of liquid prior to whipping (250 ml)}} \times 100$$

Tests were performed in duplicate and the results averaged.

The following water-soluble samples were used in this test.
1. Acetone-insoluble fraction of the IPA/MeOH extract of oats (product of Example 9).
2. SPS, sucrose palmitate stearate.
3. SDS, sodium dodecyl sulphate.
4. Epikuron 145 V
5. Epikuron 170
6. Epikuron 200

Results and discussion

The solution of the acetone-insoluble fraction of the IPA/MeOH extract of oats gave %FE values initially of about 300% declining with time to steady level of about 250% after 30 min (Table 6). Whilst the %FLS value of the SPS solutions was greater than that of the acetone-insoluble fraction of the IPA/MeOH extract of oats, the %FE was less. The SDS solutions showed very high initial foam expansions between 800 and 900% but the foam liquid stability was poor in comparison with the oat extract and SPS. The solutions of the three Epikurons showed very poor foaming properties.

EXAMPLE 13

Margarine

Preparation of margarine samples

The following recipe was used for preparing 1 kg samples of margarine and is similar to one used in Riiner, Ü. (1971) *Lebensm.-Wiss.u.Technol.*, 4, 175.

| | |
|---|---|
| 816 g | fat blend |
| 104 ml | water |
| 58 ml | semi-skimmed milk |
| 19 g | salt |
| 3 g | emulsifier |

The fat blend was composed mainly of sunflower and soya bean oils. The aqueous phase containing water, semi-skimmed milk and emulsifier, if water-soluble, was prepared at 50° C. using an Ultra-Turrax high shear mixer at ⅔ maximum speed for 1 min The pH was between 6.5 and 7.0. If the emulsifier was fat-soluble, it was dissolved in the fat blend after melting at 50° C. The molten fat blend was then added to the aqueous phase at 50° C. and mixed with the high shear mixer ⅔ maximum speed for 5 min. The resulting emulsion was then cooled under vigorous agitation in a tempering vessel using water temperature control in order to crystallise some of the fat. The minimum water temperature was 15° C. and the minimum margarine temperature was generally ca. 16° C., and this was achieved in approximately 16 min. The total cooling time was approximately 20 min. The finished margarines were then stored in sealed plastic cartons at ambient temperature.

The emulsifiers used in margarine preparation were:
1. IPA/MeOH extract of oats (product of Example 8).
2. Acetone-insoluble fraction of the IPA/MeOH extract of oats (product of Example 9).
3. IPA extract of oats (product of Example 7).
4. Acidan N12 (Grinstead Products Ltd), citric acid esters of monoglycerides.
5. Epikuron 200.
6. Admul WOL.
7. Yolkin 80 (Aarhus Oliefabrik A/S, Denmark), ammonium salts of phosphatidic acids.
8. SN A control without added emulsifier was also prepared. The incorporation of the IPA extract of oats into margarine was at 10.2 g rather than 3 g in order to increase the concentration of active components to that in the IPA/MeOH extract. In this case, the weight of fat blend was reduced to 808.8 g to compensate for the extra emulsifier. All the emulsifiers were predissolved in the fat blend with the exception of emulsifiers 2 and 4 which were pre-dissolved in the aqueous phase. A second margarine sample containing the IPA/MeOH extract of oats was subsequently prepared without including salt in the recipe.

Anti-spattering test

The anti-spattering properties of the emulsifiers in the margarine samples was assessed using a method similar to that described in Madsen, J. (1987) *Fat Science Technology*, 4, 165. A commercial sample of FLORA was also tested.

A domestic PTFE-coated frying pan (22 cm diameter) was pre-heated on an electric hot plate so that the temperature on the flat internal surface was 170° C. A weighed sample (40 g) of margarine was introduced from a plastic kitchen spatula and a sheet of paper was placed over the top of the pan for a period of 1 min. The anti-spattering properties of the emulsifiers were assessed by the coverage of fat on the paper. These tests were performed in duplicate.

Results and discussion

Studies using light microscopy determined the size of water droplets and their average size and values of the fat crystal aggregate size (Table 7). The IPA/MeOH extract of oats gave a margarine with the smallest water droplet size, 2-5 $\mu$m, and the smallest fat crystal aggregate size, 10 $\mu$m, (except for FLORA in which no fat crystals were identified). In the salt-free margarine prepared with this extract, these sizes were only marginally increased to 2-20 $\mu$m, respectively. The control containing no added emulsifier, had water droplets of 5-20 $\mu$m in size and fat crystal aggregates of 35 $\mu$m. These results, similar to those in the emulsion test (Example 10), demonstrate the excellent emulsifying properties of the IPA/MeOH extract for producing water-in-oil emulsions.

The margarines containing Acidan, Epikuron 200 and Admul WOL also showed small water droplet and fat crystal aggregate sizes. On the other hand, the effects of the IPA oat extract, at both 3 g and 10.2 g, Yolkin 80 and SN were distinguished by generally larger water droplet sizes.

In the anti-spattering test, the prepared margarines containing the IPA/MeOH extract of oats, the acetone-insoluble fraction of the IPA/MeOH extract, the IPA extract of oats at elevated concentration (i.e. 10.2 g) and Epikuron 200 displayed very little or no spattering. These margarines were at least comparable with and often better than the commercial sample of FLORA margarine. The IPA/MeOH extract of oats, in particular, gave complete suppression of spattering when the salt, which has anti-spattering properties itself, was omitted from the recipe. In contrast, the anti-spattering properties of Admul WOL and Yolkin 80 were very poor (comparable with the surfactant-free control) whilst Acidan, the reformed IPA extract of oats at the standard weight (3 g) and SN were intermediate.

TABLE 4

| Classification of emulsifiers in the emulsion test | |
|---|---|
| | Emulsifier Predissolved in (O = oil, W = water) |
| 1. Promoters of water-in-oil emulsions | |
| IPA/MeOH extract of oats | O |
| Acetone-insoluble fraction of IPA/MeOH extract of oats | O |
| Admul WOL | O |
| YN | O |
| Epikuron 200 | W |
| 2. Promoters of oil-in-water emulsions | |
| Acetone-insoluble fraction of IPA/MeOH extract of oats | W |
| SPS, sucrose palmitate stearate | W |
| Epikuron 145 V | W |
| Epikuron 170 | W |
| 3. Poor emulsifiers | |
| IPA extract of oats | O |
| SN | O |
| Acetone-insoluble fraction of SN | O or W |
| Epikuron 145V | O |
| Epikuron 170 | O |
| Epikuron 200 | O |

TABLE 5

Percentage increase in specific volume of loaves of bread containing emulsifiers.

|  | % |
| --- | --- |
| Control | 0 |
| IPA/MeOH extract of oats | 9.4 |
| IPA extract of oats | 5.5 |
| Acetone-insoluble fraction of IPA/MeOH extract of oats | 5.4 |
| Artodan SP 55 | 11.7 |
| Dimodan PV | −3.9 |
| Panodan 10V | 12.6 |
| Triodan 55 | 6.1 |

TABLE 6

Analysis of foaming properties

| Surfactant | % FE 5 min | % FE 30 min | % FLS 30 min |
| --- | --- | --- | --- |
| Acetone-insoluble fraction of the IPA/MeOH extract of oats | 301 | 246 | 4 |
| SPS | 202 | 165 | 9 |
| SDS | 858 | 595 | 3 |
| Epikuron 145V | 8 | 4 | 4 |
| Epikuron 170 | 18 | 10 | 0.4 |
| Epikuron 200 | 7 | 5 | 0.8 |

TABLE 4

Structural evaluation of margarines

| Emulsifier | Water droplet size (μm) | Average water droplet size (μm) | Fat crystal aggregate size (μm) |
| --- | --- | --- | --- |
| None | 5–20 | <15 | 35 |
| IPA/MeOH extract of oats | 2–5 | <5 | 10 |
| IPA/MeOH extract of oats (no salt) | 2–20 | <5 | 10–20 |
| Acetone-insoluble fraction of IPA/MeOH extract of oats | 2–15 | <5 | 35 |
| IPA extract of oats | 5–15 | <10 | 25 |
| IPA extract (10.2 g) | 5–35 | <15 | 10–20 |
| Acidan | 2–10 | <5 | 25 |
| Epikuron 200 | 2–25 | <10 | 25 |
| Admul WOL | 2–25 | <5 | 25 |
| YN | 5–25 | <10 | 25 |
| SN | 5–50 | <10 | 25 |
| FLORA | 2–7.5 | <5 | 0 |

The term "permitted" as used herein in relation to the solvent used for extraction means a solvent which is permitted for use in the preparation of ingredients for the food concerned according to the regulations of the country or countries in which the food is to be sold and consumed.

We claim:

1. A process for the preparation of a surfactant, comprising:
    (a) extracting oats with a permitted aliphatic alcohol, which has at least two carbon atoms, to produce an alcohol extract;
    (b) extracting said alcohol extract with methanol to produce a methanol extract;
    (c) evaporating methanol from said methanol extract to produce said surfactant.

2. A process as claimed in claim 1, wherein said aliphatic alcohol having at least 2 carbon atoms is ethanol.

3. A process as claimed in claim 1, wherein said aliphatic alcohol having at least 2 carbon atoms is isopropanol.

4. The surfactant produced by the process of claim 1, wherein said surfactant contains at least one rheologically active glycolipid having the formula:

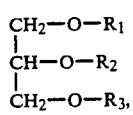

wherein $R_1$ is a digalactostyl residue, and each of $R_2$ and $R_3$ is the same or different and each is a fatty acid residue; provided that at least one of $R_2$ and $R_3$ is an unsaturated hydroxy fatty acid residue, which is esterified through the hydroxy group thereof with a second fatty acid residue, which is selected from the group consisting of saturated and unsaturated fatty acid residues, saturated and unsaturated fatty acid residues that have hydroxyl groups, and saturated and unsaturated fatty acid residues that have hydroxyl groups which are esterified with a third fatty acid residue, $F_3$, wherein the fatty acid residue $F_3$ is selected from the group consisting of saturated fatty acid residues and unsaturated fatty acid residues and $F_1$ and $F_2$ are the same or different.

5. A surfactant as claimed in claim 4, wherein each of $R_2$ and $R_3$ is an unsaturated fatty acid residue.

6. The surfactant of claim 4, wherein $R_2$ and $R_3$ are different and one of $R_2$ and $R_3$ is selected from the group consisting of unsaturated hydroxy fatty acid residues, $F_1$, which are esterified through the hydroxy group thereof with a second fatty acid residue, $F_2$, and the other of $R_2$ and $R_3$ is the an unsaturated fatty acid residue, which is the same as the fatty acid portion of $F_1$.

7. A process for the preparation of a surfactant, comprising:
    (a) extracting oats with a permitted aliphatic alcohol, which has at least two carbon atoms and in which the aliphatic portion is non-polar, to produce an alcohol extract;
    (b) extracting said alcohol extract with methanol to produce a methanol extract; and
    (c) extracting said methanol extract with acetone; and
    (d) recovering the acetone-insoluble material.

8. The process of claim 7, wherein said acetone extraction step is repeated a plurality of times.

9. The process of claim 7, further comprising drying said acetone-insoluble material.

10. The process as claimed in claim 7, wherein the acetone washings are evaporated to yield an acetone-soluble material.

* * * * *